(12) United States Patent
Bae (10) Patent No.: US 8,331,719 B2
(45) Date of Patent: Dec. 11, 2012

(54) SHARPNESS ENHANCING APPARATUS AND METHOD

(75) Inventor: Cheon-Ho Bae, Chungcheongbuk-do (KR)

(73) Assignee: MagnaChip Semiconductor, Ltd., Chungcheongbuk-do (KR)

( * ) Notice: Subject to any disclaimer, the term of this patent is extended or adjusted under 35 U.S.C. 154(b) by 703 days.

(21) Appl. No.: 12/501,723

(22) Filed: Jul. 13, 2009

(65) Prior Publication Data

US 2009/0278989 A1 Nov. 12, 2009

(30) Foreign Application Priority Data

Nov. 5, 2008 (KR) .............................. 2008-0109334

(51) Int. Cl.
*G06K 9/40* (2006.01)
(52) U.S. Cl. .................. 382/266; 382/199; 382/283
(58) Field of Classification Search .............. 345/77, 345/563, 626; 348/252, 606, 625, 663, 673, 348/687, E9.035; 358/3.15, 3.27, 532; 382/199, 382/263, 266, 269, 274, 283
See application file for complete search history.

(56) References Cited

U.S. PATENT DOCUMENTS

| | | | |
|---|---|---|---|
| 6,771,838 B1 | 8/2004 | Fan | 382/274 |
| 7,876,957 B2 * | 1/2011 | Ovsiannikov et al. | 382/167 |
| 2004/0201722 A1 | 10/2004 | Gomi et al. | 348/222.1 |
| 2006/0098729 A1 * | 5/2006 | Shen | 375/240.01 |
| 2006/0193497 A1 * | 8/2006 | Matsumoto et al. | 382/112 |
| 2007/0177060 A1 * | 8/2007 | Tsuzuki | 348/625 |
| 2007/0211176 A1 * | 9/2007 | Hsu et al. | 348/645 |
| 2007/0247405 A1 * | 10/2007 | Chan | 345/88 |
| 2007/0257866 A1 * | 11/2007 | Cok | 345/76 |
| 2008/0012968 A1 * | 1/2008 | Lim et al. | 348/252 |
| 2009/0096710 A1 * | 4/2009 | Raman et al. | 345/1.1 |
| 2009/0116685 A1 * | 5/2009 | Yoo et al. | 382/100 |
| 2010/0231765 A1 * | 9/2010 | Kefeder | 348/273 |

FOREIGN PATENT DOCUMENTS

| | | |
|---|---|---|
| EP | 1445731 A2 | 8/2004 |
| EP | 1445731 A2 * | 11/2004 |
| JP | 2006-094419 | 4/2006 |
| KR | 10 2006 0091637 A | 8/2006 |
| KR | 10 2006 0097327 A | 9/2006 |
| KR | 10-0815228 | 3/2008 |

* cited by examiner

Primary Examiner — Gregory F Cunningham
(74) Attorney, Agent, or Firm — Morgan, Lewis & Bockius LLP

(57) ABSTRACT

A sharpness enhancing apparatus include: an edge analyzing unit configured to receive image data separated into brightness signals and color signals, and analyze an edge state by using brightness signals and color signals of cells contained in a specific area; and a sharpness correcting unit configured to calculate a sharpness correction amount by performing a mask operation on a sharpen mask, which is set according to the edge state, and the brightness signals of the cells, sum the calculated sharpness correction amount and the brightness signals of the cells, and correct sharpness of the brightness signals of the cells.

30 Claims, 11 Drawing Sheets

| W | W | W |
|---|---|---|
| B | B | B |
| W | W | W |

FIG. 4B

| W | B | W |
|---|---|---|
| W | B | W |
| W | B | W |

FIG. 4C

| W | W | B |
|---|---|---|
| W | B | W |
| B | W | W |

FIG. 4D

| B | W | W |
|---|---|---|
| W | B | W |
| W | W | B |

|   |   |   |
|---|---|---|
| W | W | W |
| B | B | B |
| B | B | B |

FIG. 4H

|   |   |   |
|---|---|---|
| W | B | B |
| W | B | B |
| W | B | B |

| | SHARPEN MASK | | |
|---|---|---|---|
| | THE OTHERS | VERTICAL LINE OR HORIZONTAL LINE | DIAGONAL LINE |
| PROC2 | $\begin{bmatrix} 1 & -2 & 1 \\ -2 & 4 & -2 \\ 1 & -2 & 1 \end{bmatrix}$ | $\begin{bmatrix} -1 & 0 & -1 \\ -1 & 6 & -1 \\ -1 & 0 & -1 \end{bmatrix}$ $\begin{bmatrix} -1 & -1 & 1 \\ 0 & 6 & 0 \\ -1 & -1 & -1 \end{bmatrix}$ | $\begin{bmatrix} 1 & -2 & 0 \\ -2 & 6 & -2 \\ 0 & -2 & 1 \end{bmatrix}$ $\begin{bmatrix} 0 & -2 & 1 \\ -2 & 6 & -2 \\ 1 & -2 & 0 \end{bmatrix}$ |
| PROC1 | $\begin{bmatrix} 0 & -1 & 0 \\ -1 & 4 & -1 \\ 0 & -1 & 0 \end{bmatrix}$ | $\begin{bmatrix} 0 & 0 & 0 \\ -1 & 2 & -1 \\ 0 & 0 & 0 \end{bmatrix}$ $\begin{bmatrix} 0 & -1 & 0 \\ 0 & 2 & 0 \\ 0 & -1 & 0 \end{bmatrix}$ | |

SHARPNESS ENHANCING APPARATUS AND METHOD

CROSS-REFERENCE TO RELATED APPLICATIONS

The present invention claims priority of Korean Patent Application No. 10-2008-0109334, filed on Nov. 5, 2008, which is incorporated herein by reference.

BACKGROUND OF THE INVENTION

1. Field of the Invention

The present invention relates to an image display device; and, more particularly, to a sharpness enhancing apparatus and method of an image display device.

2. Description of Related Art

Generally, digital image display devices such as liquid crystal display (LCD) or organic light emitting diode (OLED) display image signals such as television broadcast signals inputted from the outside, signals inputted from a video card, or the like. Furthermore, digital image display devices can display signals received through various external input devices such as a digital versatile disk (DVD) player, a set-top box, or the like.

Such image display devices include a video signal processor that converts an external signal into a certain format suitable for displaying the signal. The video signal processor includes a scaler that adjusts an appropriate resolution to make an input signal suitable for a display device, converts the input signal into an RGB or YCbCr signal, and converts an input signal format into a final output format. In addition, the video signal processor enhances the contrast of an image signal and determines the sharpness of an image signal.

Regarding the image signal outputted to the image display device, sharpness is an important factor in displaying an image at a satisfactory level. This is because users prefer display devices that can display high-quality images clearly without noise. Therefore, displaying images with good sharpness is the first consideration. Sharpness is also construed as definition in scholastic terms, and represents clearness at boundaries between dark and bright portions of the image.

However, conventional sharpness enhancing methods, which have been known until now, batch-process the whole image. In such methods, enhancement degrees may be different according to image characteristics. Image characteristics may be different depending on positions in a total image. Thus, if the sharpness enhancing methods are applied indiscriminately without considerations of the image characteristics, noise may be generated because sharpness enhancement degrees are different according to the image characteristics.

SUMMARY OF THE INVENTION

An embodiment of the present invention is directed to a sharpness enhancing apparatus and method which are capable of displaying an image with an optimized definition at which sharpness can be clearly emphasized according to image characteristics.

In accordance with an aspect of the present invention, there is provided an apparatus a sharpness enhancing apparatus, including: an edge analyzing unit configured to receive image data separated into brightness signals and color signals, and analyze an edge state by using brightness signals and color signals of cells contained in a specific area; and a sharpness correcting unit configured to calculate a sharpness correction amount by performing a mask operation on a sharpen mask, which is set according to the edge state, and the brightness signals of the cells, sum the calculated sharpness correction amount and the brightness signals of the cells, and correct sharpness of the brightness signals of the cells.

In accordance with an aspect of the present invention, there is provided an apparatus a sharpness enhancing method including: receiving image data separated into brightness signals and color signals, and analyzing an edge state by using brightness signals and color signals of cells contained in a specific area; and calculating a sharpness correction amount by performing a mask operation on a sharpen mask, which is set according to the edge state, and the brightness signals of the cells, summing the calculated sharpness correction amount and the brightness signals of the cells, and correcting sharpness of the brightness signals of the cells.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

DESCRIPTION OF SPECIFIC EMBODIMENTS

The advantages, features and aspects of the invention will become apparent from the following description of the embodiments with reference to the accompanying drawings, which is set forth hereinafter. Also, like reference numerals refer to like elements throughout the drawings.

Figure 1:
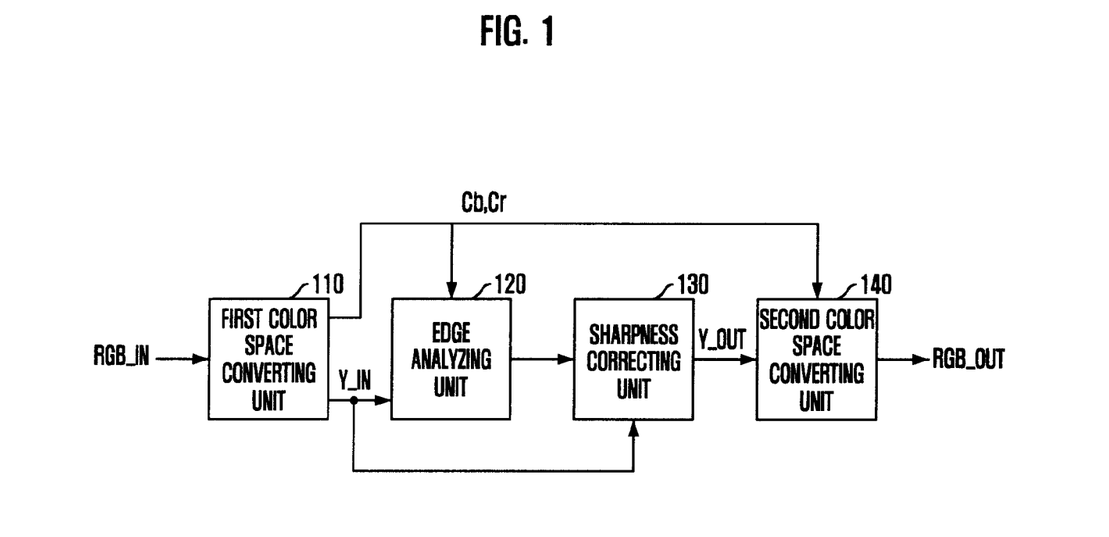
FIG. 1 is a block diagram of a sharpness enhancing apparatus in accordance with an embodiment of the present invention.

FIG. 1 is a block diagram of a sharpness enhancing apparatus in accordance with an embodiment of the present invention.

Referring to FIG. 1, the sharpness enhancing apparatus in accordance with the embodiment of the present invention includes an edge analyzing unit 120 and a sharpness correcting unit 130. The edge analyzing unit 120 receives image data separated into brightness signals, i.e., Y_IN, and color signals, i.e., Cb and Cr, and analyzes an edge state by using brightness signals and color signals of cells contained in a specific area. The sharpness correcting unit 130 calculates a sharpness correction amount by performing a mask operation on a sharpen mask, which is set according to the edge state, and the brightness signals of the cells, sums the calculated sharpness correction amount and the brightness signals of the cells, and corrects sharpness of the brightness signals of the cells.

The sharpness enhancing apparatus in accordance with the embodiment of the present invention further includes a first color space converting unit 110 and a second color space converting unit 140. The first color space converting unit 110 receives RGB image data RGB_IN and converts the received RGB image data RGB_IN into image data which are separated into the brightness signals and the color signals. The second color space converting unit 140 converts the brightness signals, brightness of which is corrected by the sharpness correcting unit 130, and the color signals, which are outputted from the first color space converting unit 110, into RGB image data RGB_OUT.

The image data separated into the brightness signals and the color signals may be one of YCbCr image data, HSV image data, and HIS image data. For example, in the case of the YCbCr image data, the brightness signals are Y signals and the color signals are chrominance (C) signals. The brightness signals refer to electric signals representing brightness of pictures in color TVs or video systems. Upon signal transmission in the color TVs or video systems, the signal representing color information is overlapped with the brightness signal in order to save frequency bandwidths of transmission signals. In this case, the signal representing the brightness information is referred to as a Y signal, and the signal component representing the color information is referred to as a C signal.

Hereinafter, for convenience, YCbCr image data will be described as an example.

The edge analyzing unit 120 calculates a first-order differential value and a second-order differential value by using a level difference between a brightness signal (Y) of a specific cell and a brightness signal (Y) of at least one cell arranged adjacent to the specific cell in a horizontal direction (X-axis direction), and determines whether an edge state is a vertical line by using the calculated first-order differential value and second-order differential value.

In addition, the edge analyzing unit 120 calculates a first-order differential value and a second-order differential value by using a level difference between a brightness signal (Y) of the specific cell and a brightness signal (Y) of at least one cell arranged adjacent to the specific cell in a vertical direction (Y-axis direction), and determines whether the edge state is a horizontal line by using the calculated first-order differential value and second-order differential value.

The edge analyzing unit 120 calculates a first-order differential value by using a level difference between a brightness signal (Y) of the specific cell and a brightness signal (Y) of at least one cell arranged adjacent to the specific cell in a diagonal direction, and determines whether the edge state is a diagonal line by using the calculated first-order differential value.

An operation characteristic of the edge analyzing unit 120 will be described in detail in conjugation with FIGS. 2 and 3.

Figure 2:
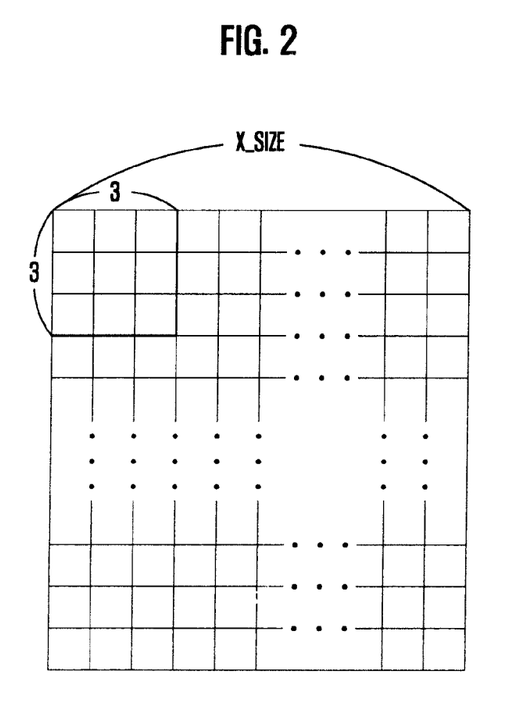
FIG. 2 illustrates a specific area applied to an image processing method in accordance with an embodiment of the present invention.
Figure 3:
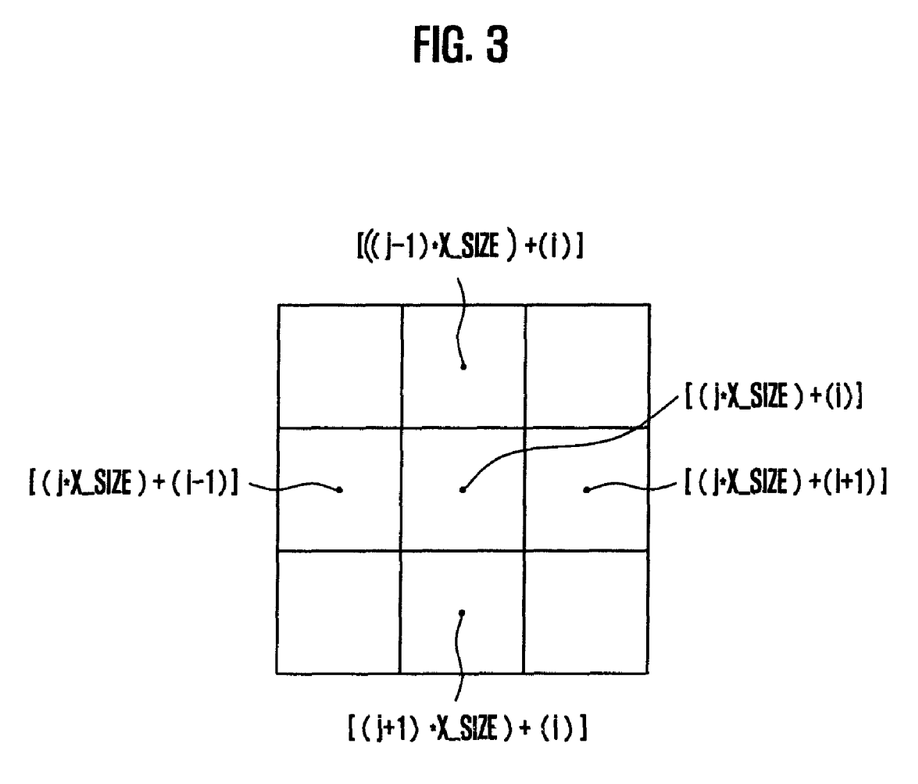
FIG. 3 illustrates a 3×3 area of FIG. 2.

FIG. 2 illustrates image data of one frame, and FIG. 3 illustrates a 3×3 area of FIG. 2. In FIG. 2, a reference 'X_SIZE' represents the number of cells arranged in the X-axis direction within one frame and it is determined by a resolution. For example, when the resolution is 240×120, X_SIZE becomes 240. In FIG. 3, the 3×3 area is a specific area for image processing. The specific area for image processing is not limited to the 3×3 area. For example, the image processing may be performed on a 5×5 area or a 7×7 area. However, as the area is larger, hardware size increases. Thus, it is preferable that the image processing is performed on a small area in view of hardware. As an example, the image processing on the 3×3 area will be described below.

The edge analyzing unit 120 receives Y signals of the 3×3 area and analyzes the edge state by using the Y signals existing within the 3×3 area. The edge state represents the existence/non-existence and types of the edge. For example, the types of the edge are divided into a linear edge and a nonlinear edge. The linear edge is divided into a horizontal line, a vertical line, and a diagonal line. The linear edge is also divided into a thin line and a thick line according to degree of the edge.

Figure 4A:
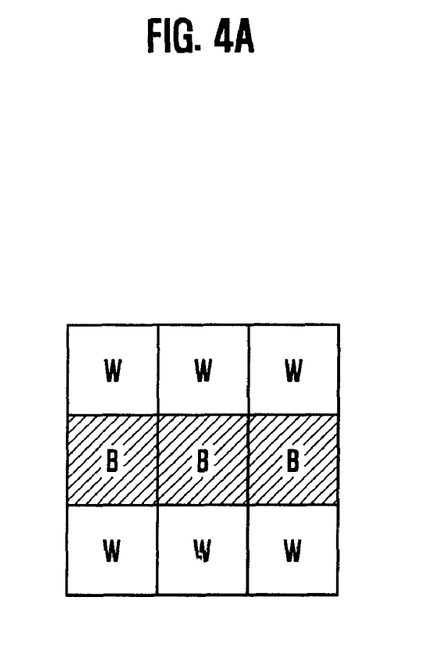
FIGS. 4A to 4H illustrate an edge state of an image in accordance with an embodiment of the present invention.
Figure 4B:
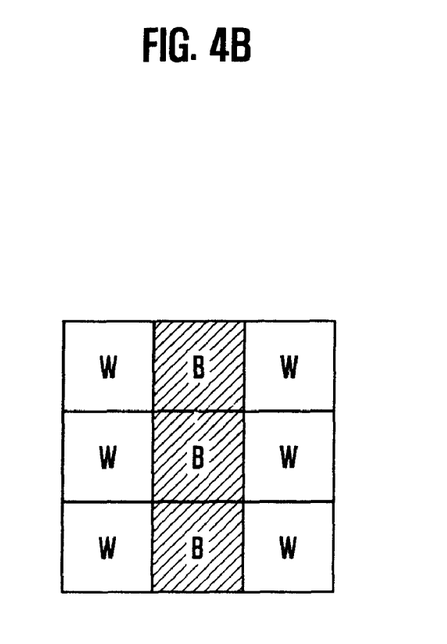
Figure 4C:
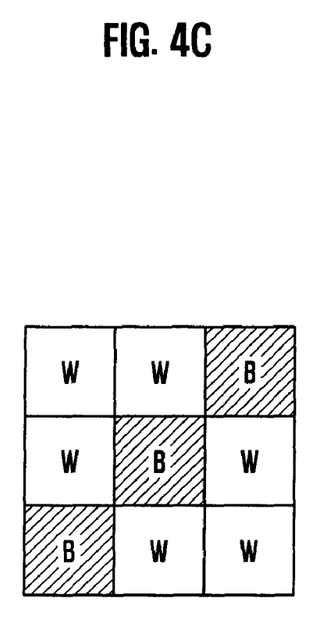
Figure 4D:
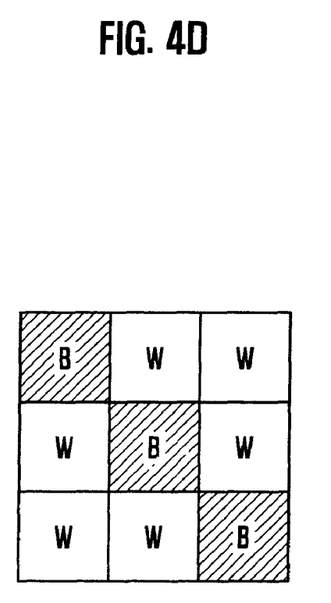
Figure 4E:
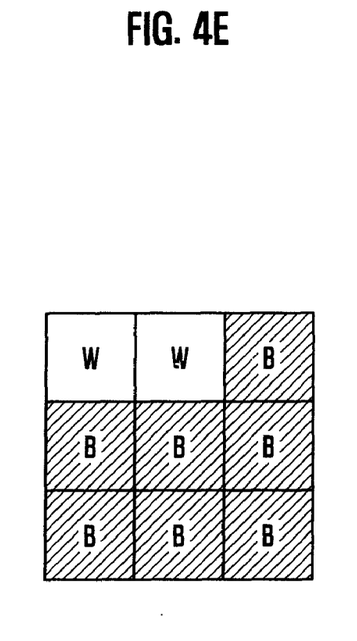
Figure 4F:
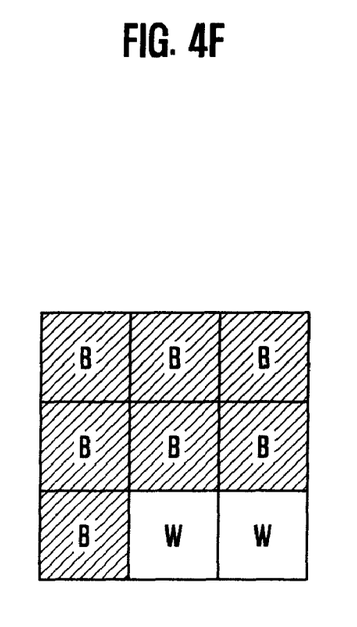
Figure 4G:
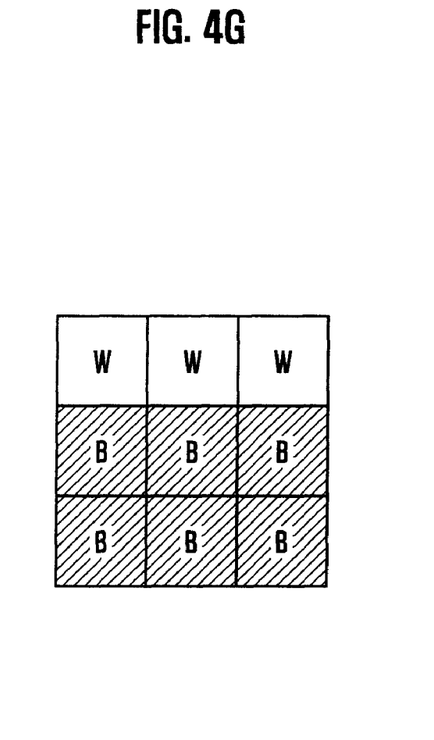
Figure 4H:
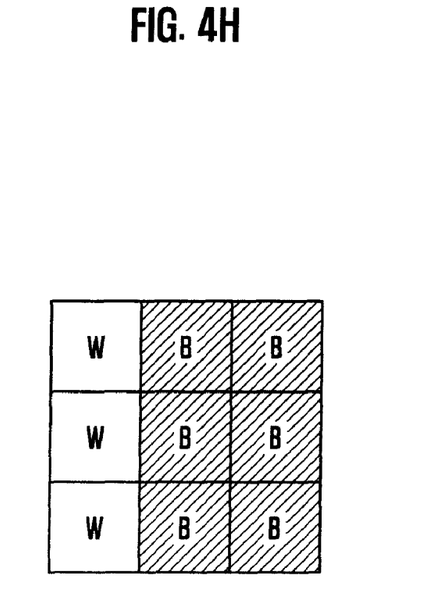

FIGS. 4A to 4H illustrate the types of the edge. In FIG. 4, "W" and "B" represent a bright area and a dark area, respectively. FIGS. 4A, 4B, 4C, 4D, 4G and 4H show the linear edges, and FIGS. 4E and 4F show the nonlinear edges. To be specific, the edges of FIGS. 4A and 4G correspond to the horizontal lines; the edges of FIGS. 4B and 4H correspond to the vertical lines; and the edges of FIGS. 4C and 4D correspond to the diagonal lines. Also, the edges of FIGS. 4A, 4B, 4C and 4D correspond to the thin lines, and the edges of FIGS. 4G and 4H correspond to the thick lines.

The existence/non-existence and types of the edge are analyzed by using the first-order differential value and the second-order differential value of the image.

The first-order differential value and the second-order differential value can be calculated using the Y signal in the 3×3 area, as expressed in the following equations. The following equations are based on (x, y) coordinates in the 3×3 area of FIG. 3.

[Equation 1]

$FDX = Y[(j \times X\_SIZE)+(i)] - Y[(j \times X\_SIZE)+(i-1)]$: First-order differential value of X-axis $SDX = 2 \times Y[k] - Y[(j \times X\_SIZE)+(i-1)] - Y[(j \times X\_SIZE)+(i+1)]$: Second-order differential value of X-axis $FDY = Y[(j \times X\_SIZE)+(i)] - Y[((j-1) \times X\_SIZE)+(i)]$: First-order differential value of Y-axis $SDY = 2 \times Y[k] - Y[((j-1) \times X\_SIZE)+(i)] - Y[(j+1) \times X\_SIZE)+(i)]$: Second-order differential value of Y-axis $FDLR = Y[((j-1) \times X\_SIZE)+(i-1)] - Y[((j+1) \times X\_SIZE)+(i+1)]$: First-order differential value of a diagonal line sloping downward from left to right $FDRL = Y[((j-1) \times X\_SIZE)+(i+1)] - Y[((j+1) \times X\_SIZE)+(i-1)]$: First-order differential value of a diagonal line sloping upward from left to right where Y is a brightness signal, X_SIZE is an X-axis resolution of an input image, i and j are an X-axis component and a Y-axis component in center coordinates, and k is [(j×X_SIZE)+(i)]

[Equation 2]

$FDX = Y[(j \times X\_SIZE)+(i)] - Y[(j \times X\_SIZE)+(i+1)]$: First-order differential value of X-axis $SDX = 2 \times Y[k] - Y[(j \times X\_SIZE)+(i-1)] - Y[(j \times X\_SIZE)+(i+1)]$: Second-order differential value of X-axis $FDY = Y[(j \times X\_SIZE)+(i)] - Y[((j+1) \times X\_SIZE)+(i)]$: First-order differential value of Y-axis $SDY = 2 \times Y[k] - Y[((j-1) \times X\_SIZE)+(i)] - Y[(j+1) \times X\_SIZE)+(i)]$: Second-order differential value of Y-axis $FDLR=Y[((j-1)\times X\_SIZE)+(i-1)]-Y[((j+1)\times X\_SIZE)+(i+1)]$: First-order differential value of a diagonal line sloping downward from left to right $FDRL=Y[((j-1)\times X\_SIZE)+(i+1)]-Y[((j+1)\times X\_SIZE)+(i-1)]$: First-order differential value of a diagonal line sloping upward from left to right where
Y is a brightness signal,
X_SIZE is an X-axis resolution of an input image,
i and j are an X-axis component and a Y-axis component in center coordinates, and
k is [(j×X_SIZE)+(i)]

[Equation 3]

$FDX=Y[(j\times X\_SIZE)+(i)]-Y[(j\times X\_SIZE)+(i-1)]-Y[(j\times X\_SIZE)+(i+1)]$: First-order differential value of X-axis $SDX=2\times Y[k]-Y[(j\times X\_SIZE)+(i-1)]-Y[(j\times X\_SIZE)+(i+1)]$: Second-order differential value of X-axis $FDY=Y[(j\times X\_SIZE)+(i)]-Y[((j-1)\times X\_SIZE)+(i)]-Y[(j+1)\times X\_SIZE)+(i)]$: First-order differential value of Y-axis $SDY=2\times Y[k]-Y[((j-1)\times X\_SIZE)+(i)]-Y[((j+1)\times X\_SIZE)+(i)]$: Second-order differential value of Y-axis $FDLR=Y[((j-1)\times X\_SIZE)+(i-1)]-Y[((j+1)\times X\_SIZE)+(i+1)]$: First-order differential value of a diagonal line sloping downward from left to right $FDRL=Y[((j-1)\times X\_SIZE)+(i+1)]-Y[((j+1)\times X\_SIZE)+(i-1)]$: First-order differential value of a diagonal line sloping upward from left to right where
Y is a brightness signal,
X_SIZE is an X-axis resolution of an input image,
i and j are an X-axis component and a Y-axis component in center coordinates, and
k is [(j×X_SIZE)+(i)]

The contents of Equations 1 to 3 are similar to one another. Only difference between them is that reference cells are different in calculating the first-order differential values and the second-order differential values of X-axis and Y-axis.

For example, in Equation 1, existence/non-existence of the vertical line is determined using the first-order differential value and the second-order differential value of X-axis, and existence/non-existence of the horizontal line is determined using the first-order differential value and the second-order differential value of Y-axis. Likewise, existence/non-existence of the diagonal line is determined using the first-order differential values of the diagonal line sloping downward from left to right and the diagonal line sloping upward from left to right.

The existence/non-existence and types of the edge are determined by comparing a plurality of preset threshold values with the first-order and second-order differential values of X-axis and Y-axis, the first-order differential value of the diagonal line sloping downward from left to right, and the first-order differential value of the diagonal line sloping upward from left to right. The degree of the edge, either the thick line or the thin line, is determined using the existence/non-existence and types of the edge.

The following Table 1 shows the analysis results of the edge state, which are obtained using the first-order and second-order differential values in Equation 1.

TABLE 1

| Condition 1 | Strong border |
| --- | --- |
| Condition 2 | Thin line |
| Condition 3 | Extremely steady area, skin tone |
| Condition 4 | Stable area |
| Condition 5 | Thick line, the others |

The conditions of Table 1 above are merely exemplary, and the number of the conditions may increase or decrease without limitation.

In the current example, the image is divided into five cases according to characteristics of the edge state. The condition 1 has the highest priority, and the condition 5 has the lowest priority. That is, the priority decreases in the order of the condition 1, the condition 2, the condition 3, the condition 4, and the condition 5. The sharpness enhancing method is different according to the analysis results of the edge state.

In Table 1, the conditions are divided by using a plurality of preset threshold values. The threshold values are set to different level values and may be divided into five level values as many as the conditions. Each threshold value is compared with the first-order and second-order differential values calculated from Equation 1, and the conditions are matched corresponding to the existence/non-existence and types of the edge according to the comparison results.

The condition 1 corresponds to the storing border (strong edge), in which the edge state has an edge component value higher than the thick line. The condition 2 corresponds to the thin line edge. The condition 3 corresponds to the extremely steady area and skin tone. The extremely steady area corresponds to a borderless area. The skin tone is separated by using the color signal. Its criterion may be different according to a color coordinate system used in the first color space converting unit 110.

In the case of YCbCr image data exemplified in the current embodiment, its criterion is determined according to the brightness signal and the color signal (Cr, Cb) of the corresponding cell. For example, if satisfying the conditions of 90<Cb<135 and 85<Cr<175, the edge state is considered as the skin tone. The condition 4 corresponds to the stable area. The stable area is the nonlinear edge and includes multi-directional edges, but has a relatively small edge component value. The condition 5 includes the thick line edge or nonlinear edge, but has a relatively large edge component value.

Figure 5:
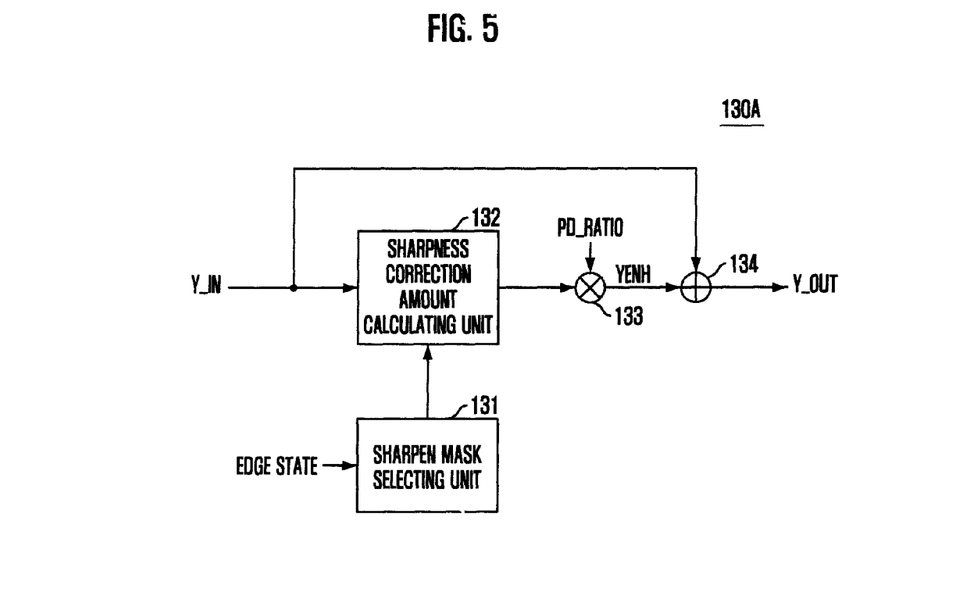
FIGS. 5 to 7 are block diagrams illustrating a sharpness correcting unit of FIG. 1.
Figure 6:
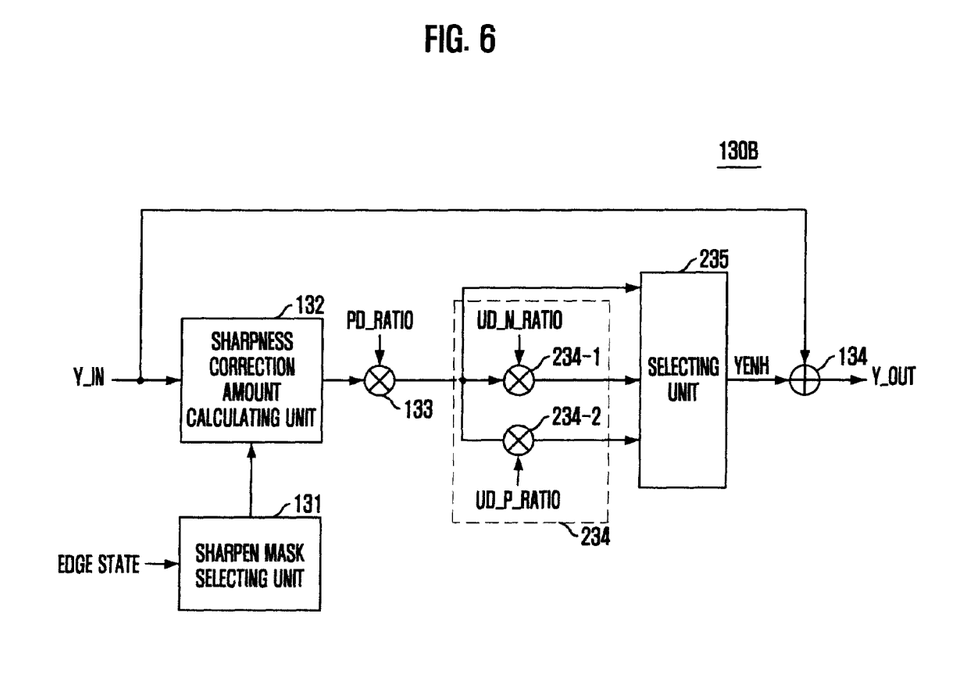
Figure 7:
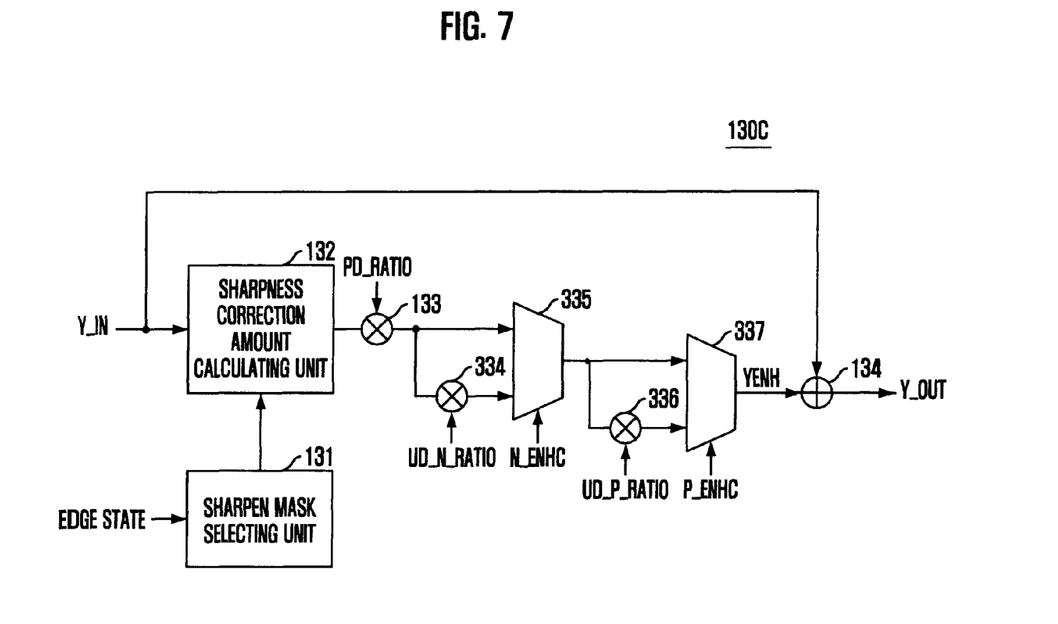

FIGS. 5 to 7 are block diagrams illustrating the structure of the sharpness correcting unit 130.

Referring to FIG. 5, the sharpness correcting unit 130A includes a sharpen mask selecting unit 131, a sharpness correction amount calculating unit 132, an initial weight assigning unit 133, and a summing unit 134. The sharpen mask selecting unit 131 selects a sharpen mask which is set according to the edge state analyzed by the edge analyzing unit 120.

The sharpness correction amount calculating unit 132 calculates a sharpness correction amount for the brightness signals Y_IN of the cells by performing a one-to-one mask operation on the selected sharpen mask and the brightness signals Y_IN inputted from the edge analyzing unit 120. The initial weight assigning unit 133 assigns an initial weight PD_RATIO to the sharpness correction amount and outputs a sharpness correction signal YENH. The summing unit 134 sums the sharpness correction signal YENH and the brightness signals Y_IN of the cells.

Referring to FIG. 6, the sharpness correcting unit 130B may further include a user weight assigning unit 234 and a selecting unit 235, which are provided between the initial weight assigning unit 133 and the summing unit 134. The user weight assigning unit 234 sets the sharpness correction amount, to which the initial weight PD_RATIO is assigned, as a sharpness reference value, and assigns negative and positive user weights UD_N_RATIO and UD_P_RATIO, which is set according to the sharpness reference value, to the sharpness reference value. The selecting unit 235 selects one of the sharpness reference value and the sharpness reference values to which the negative and positive user weights UD_N_RATIO and UD_P_RATIO, thereby outputting the selected sharpness reference value as the sharpness correction signal YENH.

Referring to FIG. 7, the sharpness correcting unit 130C may further include a negative weight assigning unit 334, a first selecting unit 335, a positive weight assigning unit 336, and a second selecting unit 337, which are provided between the initial weight assigning unit 133 and the summing unit 134. The negative weight assigning unit 334 sets the sharpness correction amount, to which the initial weight PD_RATIO is assigned, as a sharpness reference value, and assigns a negative user weight UD_N_RATIO to the sharpness reference value. The first selecting unit 335 selects one of the sharpness reference value and the sharpness reference value to which the negative user weight UD_N_RATIO. The positive weight assigning unit 336 assigns a positive user weight UD_P_RATIO to the sharpness reference value selected by the first selecting unit 335. The second selecting unit 337 selects one of the sharpness reference value selected by the first selecting unit 335 and the sharpness reference value to which the positive user weight UD_P_RATIO is assigned, thereby outputting the selected sharpness reference value as the sharpness correction signal YENH.

In FIGS. 5 to 7, the sharpen mask selecting unit 131 selects one of the sharpen mask masks, which are previously set in consideration of the edge states, according to the inputted edge state.

Figure 8:
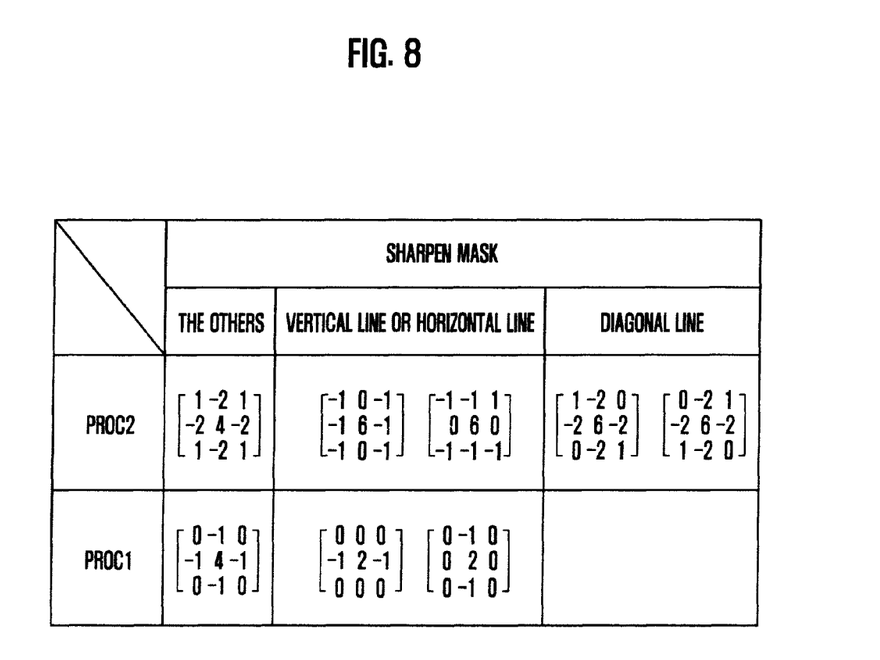
FIG. 8 illustrates a sharpen mask in accordance with an embodiment of the present invention.

As illustrated in FIG. 8, the sharpen mask is configured in a matrix having coefficients which one-to-one correspond to the cells of a specific area. For example, in the case of the 3×3 area, the sharpen mask is configured in a 3×3 matrix. There is no limitation in the type of the matrix. The type of the matrix is determined by the size of the specific area. The 3×3 matrix, 5×5 matrix, and 7×7 matrix may be used. Furthermore, the number of components of the matrix may increase or decrease, and their total sum is "0".

The sharpness correction amount calculating unit 132 calculates the sharpness correction amount by performing a one-to-one mask operation on the brightness signals Y_IN of the cells and the sharpen mask.

Figure 9:
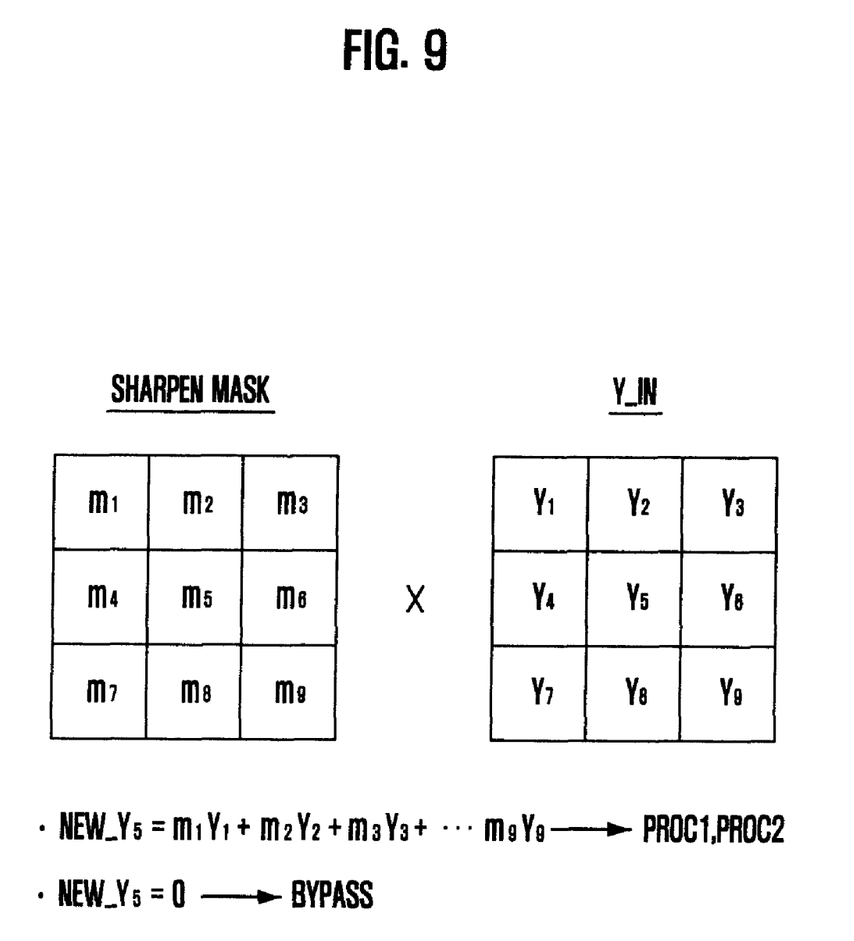
FIG. 9 illustrates a mask operation in accordance with an embodiment of the present invention.

FIG. 9 illustrates an example of the mask operation. Referring to FIG. 9, when assuming that the mask operation on Y5 is performed, the sharpness correction amount (NEW_Y$_5$) on Y5 is expressed as Equation 4 below.

[Equation 4]

$$NEW\_Y_5 = m_1Y_1 + m_2Y_2 + m_3Y_3 + \ldots + m_9Y_9$$

where $Y_1$-$Y_9$ are level values of the brightness signal Y_IN of each cell, and $m_1$-$m_9$ are matrix coefficients of the sharpen mask.

Since the sharpness correction is not stably achieved if using only the sharpness correction amount calculated by the sharpness correction amount calculating unit 132, unwanted results may be caused in some images. Therefore, it is preferable to assign the initial weight PD_RATIO to the sharpness correction amount, and the border contained in the image is strongly expressed by assigning the initial weight PD_RATIO.

The initial weight assigning unit 133 calculates the sharpness reference value by multiplying the initial weight PD_RATIO by the sharpness correction amount. The sharpness reference value may be a positive value or a negative value. In this case, the initial weight PD_RATIO has a value ranging from 0 to 1.

Figure 11A:
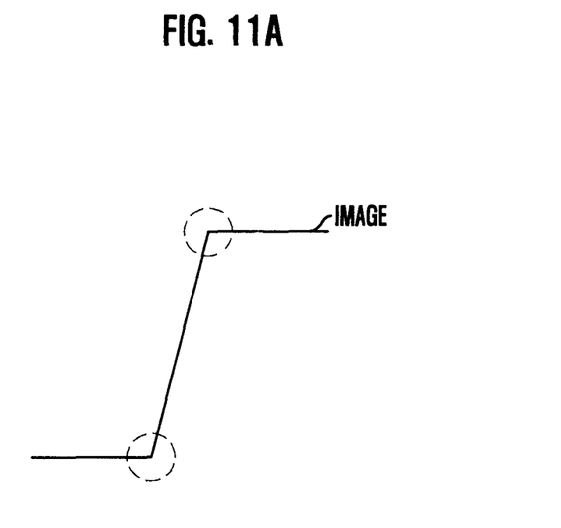
FIGS. 11A and 11B are diagrams explaining a negative weight and a positive weight in accordance with an embodiment of the present invention.
Figure 11B:
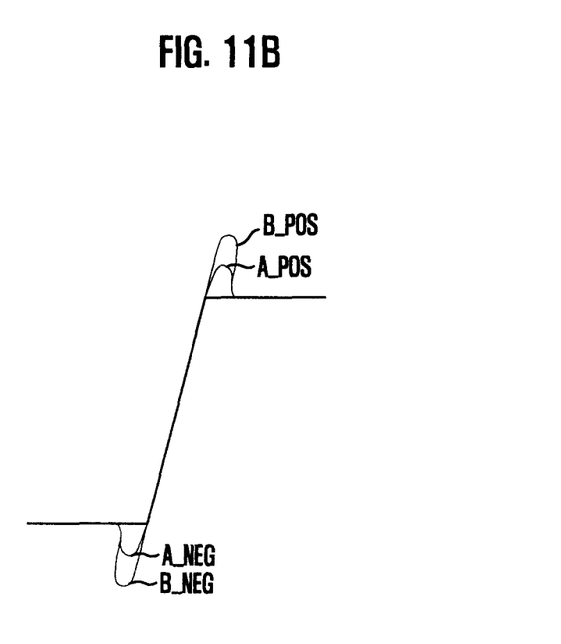

For example, if the initial weight PD_RATIO is assigned to the image existing at borders of the upper and lower portions (see a dotted circle) as illustrated in FIG. 11A, the borders are expanded like 'A_POS', 'B_POS', 'A_NEG' and 'B_NEG' as illustrated in FIG. 11B. A_POS and B_POS correspond to the positive values, and A_NEG and B_NEG correspond to the negative values. That is, the positive values correspond to a positive enhancement, and the negative values correspond to a negative enhancement.

In FIG. 6, the user weight assigning unit 234 selectively assigns the negative and positive user weights UD_N_RATIO and UD_P_RATIO according to the sharpness reference value. The negative and positive user weights UD_N_RATIO and UD_P_RATIO may be divided into several steps by changing the weight levels. Furthermore, in order to prevent an excessive enhancement, the negative and positive user weights UD_N_RATIO and UD_P_RATIO are multiplied by referring to the range of the sharpness reference value.

The user weight assigning unit 234 includes a negative weight assigning unit 234-1 and a positive weight assigning unit 234-2. The negative weight assigning unit 234-1 assigns the negative user weight UD_N_RATIO to the sharpness reference value, and the positive weight assigning unit 234-2 assigns the positive user weight UD_P_RATIO. The positive user weight UD_P_RATIO and the negative user weight UD_N_RATIO have values ranging from 0 to 1.

In FIG. 11B, when the sharpness reference value corresponds to 'B_NEG', the sharpness is enhanced to 'A_NEG' by assigning the negative user weight UD_N_RATIO. When the sharpness reference value corresponds to 'B_POS', the sharpness is enhanced to 'A_POS' by assigning the positive user weight UD_P_RATIO.

For example, the negative enhancement condition applies the negative user weight UD_N_RATIO having the value ranging between "0" and "1" if [absolute value(absolute value(sharpness reference value)−Y_IN)<THD]; otherwise, "1" is applied. The positive enhancement condition applies the positive user weight UD_P_RATIO having the value ranging between "0" and "1" if [sharpness reference value>THB]; otherwise, "1" is applied. "THD" represents a threshold value of a black area (dark area), and "THB" represents a threshold value of a white area (bright area). For example, THD may be 50 and THB may be 40.

In FIG. 6, the selecting unit 235 selects one of the sharpness reference value to which the user weight is assigned, and the sharpness reference value to which the user weight is not assigned (or, the sharpness reference value to which the user weight "1" is assigned) according to the sharpness reference value. The selecting unit 235 selects one of the inputted sharpness reference values by comparing the brightness signal Y_IN and the sharpness reference value.

In FIG. 7, the negative weight assigning unit 334 assigns the negative user weight UD_N_RATIO to the sharpness correction amount outputted from the initial weight assigning unit 133. The first selecting unit 335 selects one of the sharpness reference value to which the negative user weight UD_N_RATIO is assigned, and the sharpness reference value to which the negative user weight UD_N_RATIO is not assigned (or, the sharpness reference value to which the negative user weight "1" is assigned) in response to a negative enhancement signal N_ENHC. The positive weight assigning unit 336 assigns the positive user weight UD_P_RATIO to the sharpness reference value outputted from the first selecting unit 335.

The second selecting unit 337 selects one of the sharpness reference value to which the positive user weight UD_P_RATIO is assigned, and the sharpness reference value to which the positive user weight UD_P_RATIO is not assigned (or, the sharpness reference value to which the positive user weight "1" is assigned) in response to a positive enhancement signal P_ENHC. The negative enhancement signal N_ENHC is determined according to the brightness signal Y_IN and the sharpness reference value outputted from the initial weight assigning unit 133, and the positive enhancement signal P_ENHC is determined by the brightness signal Y_IN and the sharpness reference value outputted from the first selecting unit 335.

Figure 10:
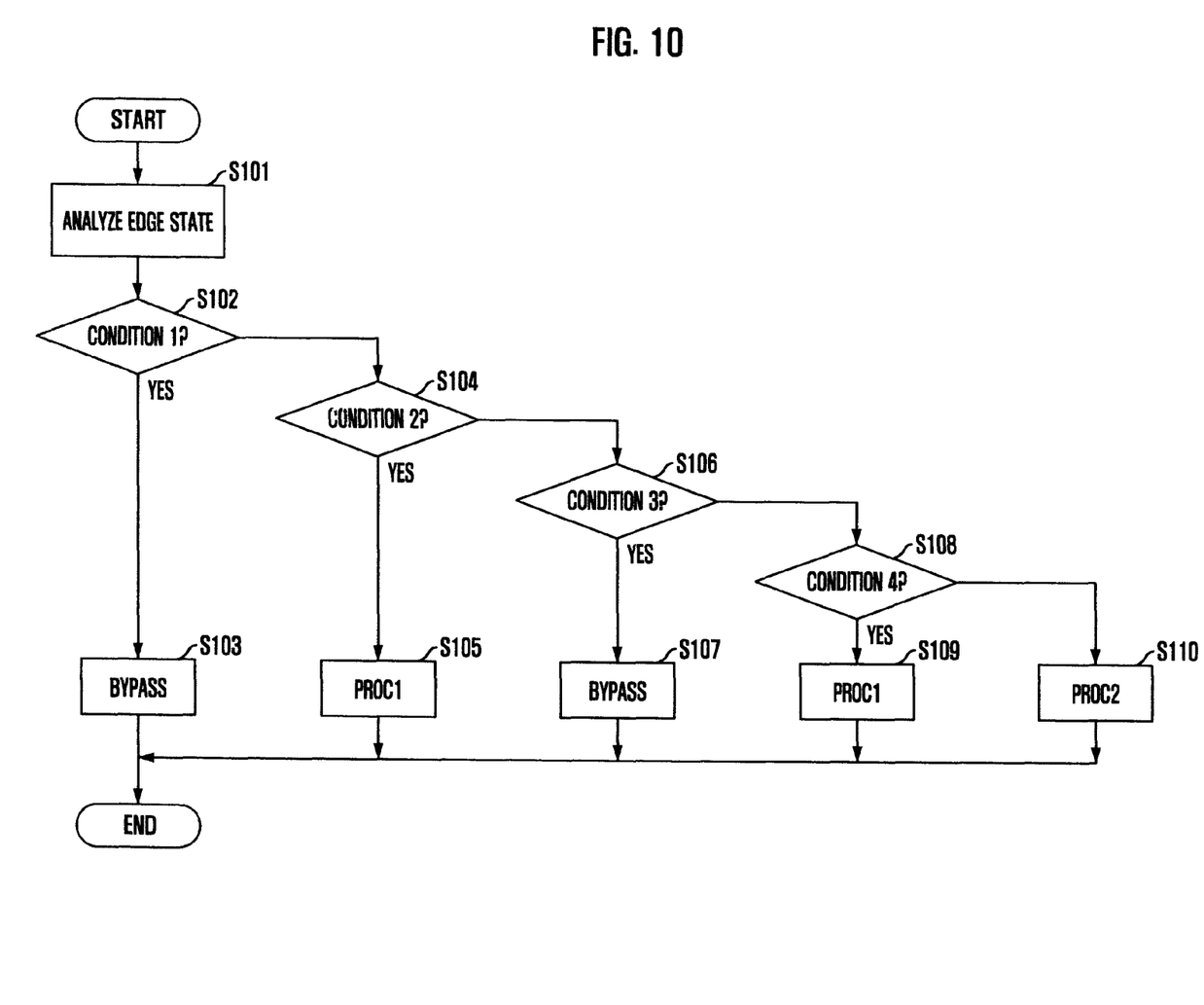
FIG. 10 is a flowchart describing a sharpness enhancing method in accordance with an embodiment of the present invention.

FIG. 10 is a flowchart illustrating the edge state analysis and the mask operation.

Referring to FIG. 10, the edge state is analyzed in operation S101. In operation S102, it is determined whether the edge state of the current cell corresponds to the condition 1 of Table 1. When the edge state corresponds to the condition 1, the inputted brightness signal Y_IN is bypassed in operation S103. When the edge state corresponds to the condition 2 in operation S104, the mask operation is performed using the sharpen mask corresponding to "PROC1" of FIG. 8 in operation S105.

When the edge stage corresponds to the condition 3 in operation S106, the brightness signal Y_IN is bypassed in operation S107. When the edge state corresponds to the condition 4 in operation S108, the mask operation is performed using the sharpen mask corresponding to "PROC1" of FIG. 8 in operation S109. When the edge state does not correspond to the condition 4 in operation S108, it is considered as the condition 5 and the mask operation is performed using the sharpen mask corresponding to "PROC2" of FIG. 8 in operation S110.

In accordance with the embodiments of the present invention, the sharpness correction amount is calculated using the sharpen mask specified according to the edge state of the image, and the calculated sharpness correction amount is set as the reference value. Then, the sharpness of the image is enhanced by appropriately assigning the user weight according to the reference value, thereby preventing the generation of noise and obtaining the optimized definition.

While the present invention has been described with respect to the specific embodiments, it will be apparent to those skilled in the art that various changes and modifications may be made without departing from the spirit and scope of the invention as defined in the following claims.

What is claimed is:

1. A sharpness enhancing apparatus, comprising:
    an edge analyzing unit configured to:
        receive brightness signals and color signals of an image data; and
        analyze an edge state by using brightness signals and color signals of cells contained in a specific area;
    a sharpen mask setting unit configured to set a plurality of sharpen masks according to the analyzed edge state; and
    a sharpness correcting unit configured to:
        select a sharpen mask according to the analyzed edge state, to calculate a sharpness correction amount by performing a mask operation on the selected sharpen mask and the brightness signals of the cells; and
        sum the calculated sharpness correction amount and the brightness signals of the cells to correct sharpness of the brightness signals of the cells.

2. The sharpness enhancing apparatus of claim 1, wherein the image data comprises one of YCbCr image data, HSV image data, and HIS image data.

3. The sharpness enhancing apparatus of claim 1, wherein the edge analyzing unit calculates a first-order differential value and a second-order differential value by using a level difference between a brightness signal of a specific cell and a brightness signal of at least one cell arranged adjacent to the specific cell in a horizontal direction, and determines whether the edge state is a vertical line based on the calculated first-order differential value and second-order differential value.

4. The sharpness enhancing apparatus of claim 1, wherein the edge analyzing unit calculates a first-order differential value and a second-order differential value by using a level difference between a brightness signal of a specific cell and a brightness signal of at least one cell arranged adjacent to the specific cell in a vertical direction, and determines whether the edge state is a horizontal line based on the calculated first-order differential value and second-order differential value.

5. The sharpness enhancing apparatus of claim 1, wherein the edge analyzing unit calculates a first-order differential value by using a level difference between a brightness signal of a specific cell and a brightness signal of at least one cell arranged adjacent to the specific cell in a diagonal direction, and determines whether the edge state is a diagonal line based on the calculated first-order differential value.

6. The sharpness enhancing apparatus of claim 1, wherein the edge analyzing unit calculates a first-order differential value and a second-order differential value by using a level difference between a brightness signal of a specific cell and a brightness signal of at least one cell arranged adjacent to the specific cell in horizontal and vertical directions, calculates a first-order differential value by using a level difference between the brightness signal of the specific cell and a brightness signal of at least one cell arranged adjacent to the specific cell in a diagonal direction, and determines the edge state based on the calculated first-order differential values and second-order differential value.

7. The sharpness enhancing apparatus of claim 6, wherein the edge analyzing unit compares the calculated first-order differential values and second-order differential value with a plurality of set reference values to determine whether the edge state is a linear edge or a nonlinear edge.

8. The sharpness enhancing apparatus of claim 1, wherein the sharpen mask is configured in a matrix having coefficients which one-to-one correspond to the cells.

9. The sharpness enhancing apparatus of claim 8, wherein a total sum of the coefficients is zero.

10. The sharpness enhancing apparatus of claim 1, wherein the sharpness correcting unit comprises:
    a sharpen mask selecting unit configured to select a sharpen mask set according to the edge state;
    a sharpness correction amount calculating unit configured to calculate a sharpness correction amount for the brightness signals of the cells by performing a one-to-one mask operation on the selected sharpen mask and the brightness signals of the cells;
    an initial weight assigning unit configured to assign an initial weight to the sharpness correction amount; and
    a summing unit configured to sum the sharpness correction amount, to which the initial weight is assigned, and the brightness signals of the cells.

11. The sharpness enhancing apparatus of claim 1, wherein the sharpness correcting unit comprises:
    a sharpen mask selecting unit configured to select a sharpen mask set according to the edge state;

a sharpness correction amount calculating unit configured to calculate a sharpness correction amount for the brightness signals of the cells by performing a one-to-one mask operation on the selected sharpen mask and the brightness signals of the cells;

an initial weight assigning unit configured to assign an initial weight to the sharpness correction amount;

a user weight assigning unit configured to set the sharpness correction amount, to which the initial weight is assigned, as a sharpness reference value, and assign a user weight to the sharpness reference value according to the sharpness reference value;

a selecting unit configured to select one of the sharpness reference value and the sharpness reference value to which the user weight is assigned; and a summing unit configured to sum the sharpness reference value selected by the selecting unit and the brightness signal of the cells.

12. The sharpness enhancing apparatus of claim 1, wherein the sharpness correcting unit comprises:

a sharpen mask selecting unit configured to select the sharpen mask set according to the edge state;

a sharpness correction amount calculating unit configured to calculate a sharpness correction amount for the brightness signals of the cells by performing a one-to-one mask operation on the selected sharpen mask and the brightness signals of the cells;

an initial weight assigning unit configured to assign an initial weight to the sharpness correction amount;

a negative weight assigning unit configured to set the sharpness correction amount, to which the initial weight is assigned, as a sharpness reference value, and assign a set negative weight to the sharpness reference value;

a first selecting unit configured to select one of the sharpness reference value and the sharpness reference value to which the negative weight is assigned;

a positive weight assigning unit configured to assign a positive weight to the sharpness reference value selected by the first selecting unit;

a second selecting unit configured to select one of the sharpness reference value selected by the first selecting unit and the sharpness reference value to which the positive weight is assigned; and a summing unit configured to sum the sharpness reference value selected by the second selecting unit and the brightness signal of the cells.

13. The sharpness enhancing apparatus of claim 10, wherein the initial weight has a value ranging between 0 and 1.

14. The sharpness enhancing apparatus of claim 12, wherein the negative weight and the positive weight have values ranging between 0 and 1.

15. The sharpness enhancing apparatus of claim 1, further comprising a first color space converting unit configured to receive RGB image data and convert the received RGB image data into image data which is separated into the brightness signals and the color signals.

16. The sharpness enhancing apparatus of claim 1, further comprising a second color space converting unit configured to convert the color signals and the brightness signals outputted through the sharpness correcting unit into RGB image data.

17. A sharpness enhancing method, comprising:

receiving brightness signals and color signals of an image data;

analyzing an edge state by using brightness signals and color signals of cells contained in a specific area;

setting a plurality of sharpen masks according to the analyzed edge state;

selecting a sharpen mask according to the analyzed edge;

calculating a sharpness correction amount by performing a mask operation on the selected sharpen mask and the brightness signals of the cells; and summing the calculated sharpness correction amount and the brightness signals of the cells to correct sharpness of the brightness signals of the cells.

18. The sharpness enhancing method of claim 17, wherein the image data comprises one of YCbCr image data, HSV image data, and HIS image data.

19. The sharpness enhancing method of claim 17, wherein the analyzing the edge state comprises:

calculating a first-order differential value and a second-order differential value by using a level difference between a brightness signal of a specific cell and a brightness signal of at least one cell arranged adjacent to the specific cell in a horizontal direction; and determining whether the edge state is a vertical line based on the calculated first-order differential value and second-order differential value.

20. The sharpness enhancing method of claim 17, wherein the analyzing the edge state comprises:

calculating a first-order differential value and a second-order differential value by using a level difference between a brightness signal of the specific cell and a brightness signal of at least one cell arranged adjacent to the specific cell in a vertical direction; and determining whether the edge state is a horizontal line based on the calculated first-order differential value and second-order differential value.

21. The sharpness enhancing method of claim 17, wherein the analyzing the edge state comprises:

calculating a first-order differential value by using a level difference between the brightness signal of the specific cell and a brightness signal of at least one cell arranged adjacent to the specific cell in a diagonal direction; and determining whether the edge state is a diagonal line based on the calculated first-order differential value.

22. The sharpness enhancing method of claim 17, wherein the analyzing the edge state comprises:

calculating a first-order differential value and a second-order differential value by using a level difference between the brightness signal of the specific cell and a brightness signal of at least one cell arranged adjacent to the specific cell in horizontal and vertical directions;

calculating a first-order differential value by using a brightness level between the brightness signal of the specific cell and a brightness signal of at least one cell arranged adjacent to the specific cell in a diagonal direction; and determining the edge state based on the calculated first-order differential values and second-order differential value.

23. The sharpness enhancing method of claim 22, wherein the analyzing the edge state comprises comparing the calculated first-order differential values and second-order differential value with a plurality of set reference values to determine whether the edge state is a linear edge or a nonlinear edge.

24. The sharpness enhancing method of claim 17, wherein the sharpen mask is configured in a matrix having coefficients which one-to-one correspond to the cells.

25. The sharpness enhancing method of claim 24, wherein a total sum of the coefficients is zero.

26. The sharpness enhancing method of claim 17, wherein the calculating the sharpness correction amount comprises:

calculating a sharpness correction amount for the brightness signals of the cells by performing a one-to-one mask operation on the selected sharpen mask and the brightness signals of the cells; and assigning an initial weight to the sharpness correction amount, wherein the summing the sharpness correction amount comprises summing the sharpness correction amount, to which the initial weight is assigned, and the brightness signals of the cells.

27. The sharpness enhancing method of claim 17, wherein the calculating the sharpness correction amount comprises:

calculating a sharpness correction amount for the brightness signals of the cells by performing a one-to-one mask operation on the set sharpen mask and the brightness signals of the cells;

assigning an initial weight to the sharpness correction amount;

setting the sharpness correction amount, to which the initial weight is assigned, as a sharpness reference value, and assigning a set user weight to the sharpness reference value according to the sharpness reference value; and selecting one of the sharpness reference value and the sharpness reference value to which the user weight is assigned, wherein the summing the sharpness correction amount comprises summing the selected sharpness reference value and the brightness signals of the cells.

28. The sharpness enhancing method of claim 26, wherein the initial weight has a value ranging from 0 to 1.

29. The sharpness enhancing method of claim 17, further comprising, before analyzing the edge state, receiving RGB image data and converting the received RGB image data into image data which is separated into the brightness signals and the color signals.

30. The sharpness enhancing method of claim 17, further comprising, after correcting the sharpness of the brightness cells of the cells, converting the sharpness-corrected brightness signal and the color signal into RGB image data.

* * * * *